(12) United States Patent
Gearhart et al.

(10) Patent No.: US 8,337,587 B2
(45) Date of Patent: Dec. 25, 2012

(54) CARBON DIOXIDE PURIFICATION

(75) Inventors: Loren E. Gearhart, Houston, TX (US);
Sanjiv N. Patel, Sugar Land, TX (US);
David Koch, Katy, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 625 days.

(21) Appl. No.: 12/123,904

(22) Filed: May 20, 2008

(65) Prior Publication Data

US 2009/0288556 A1    Nov. 26, 2009

(51) Int. Cl.
*B01D 53/22* (2006.01)
(52) U.S. Cl. .............. 95/51; 62/624; 62/929; 95/43; 95/45; 96/4
(58) Field of Classification Search ............. 95/43, 45, 95/51; 62/624, 629; 96/4
See application file for complete search history.

(56) References Cited

U.S. PATENT DOCUMENTS

| | | | |
|---|---|---|---|
| 3,766,027 A * | 10/1973 | Gregory | 205/349 |
| 4,374,657 A * | 2/1983 | Schendel et al. | 62/624 |
| 4,602,477 A | 7/1986 | Lucadamo | |
| 4,639,257 A | 1/1987 | Duckett et al. | |
| 4,659,343 A * | 4/1987 | Kelly | 95/46 |
| 4,747,858 A * | 5/1988 | Gottier | 62/632 |
| 4,762,543 A | 8/1988 | Pantermuehl et al. | |
| 4,936,887 A | 6/1990 | Waldo et al. | |
| 5,365,740 A * | 11/1994 | Kikkawa et al. | 62/613 |
| 6,070,431 A | 6/2000 | Howard | |
| 7,124,605 B2 | 10/2006 | Parro et al. | |
| 2004/0099138 A1 * | 5/2004 | Karode et al. | 95/214 |
| 2005/0092594 A1 | 5/2005 | Parro et al. | |
| 2006/0107691 A1 | 5/2006 | Howard | |
| 2007/0231244 A1 | 10/2007 | Shah et al. | |

FOREIGN PATENT DOCUMENTS

GB    2174379 A  *  11/1986

OTHER PUBLICATIONS

Felder et al. (Elementary Principles of Chemical Processes) 2000, John Wiley & Sons, Inc., 3rd edition, pp. 196 and 197.*
Parlatuna "Chapter 7 The Dehydration and Sweetening of Natural gas" http://web.archive.org/web/20041012091408/http://www.ipt.ntnu.no/~jsg/undervisning/naturgass/parlaktuna/Chap7.pdf Oct. 12, 2004 pp. 85-89.*
International Search Report and the Written Opinion of the International Searching Authority dated Jun. 4, 2010.
Song et al., "Water Content of CO2 in Equilibrium With Liquid Water and/or Hydrates", SPE Formation Evaluation, Dec. 1987, pp. 500-508.

* cited by examiner

*Primary Examiner* — Jason M Greene
*Assistant Examiner* — Anthony Shumate
(74) *Attorney, Agent, or Firm* — Alix, Yale & Ristas, LLP

(57) ABSTRACT

A process for the recovery of carbon dioxide from a gas mixture that includes pretreating a gas mixture comprising carbon dioxide, water vapor, and one or more light gases in a pretreating system to form a cooled gas mixture, fractionating the cooled gas mixture to recover a bottoms fraction comprising carbon dioxide and an overheads fraction comprising carbon dioxide and the light gases, passing the overheads fraction over a membrane selective to carbon dioxide to separate a carbon dioxide permeate from a residue gas comprising the light gases, recycling the carbon dioxide permeate to the pretreating system, and recovering at least a portion of the bottoms fraction as a purified carbon dioxide product stream is described.

12 Claims, 3 Drawing Sheets

CARBON DIOXIDE PURIFICATION

BACKGROUND OF DISCLOSURE

1. Field of the Disclosure

Embodiments disclosed herein relate generally to a process for carbon dioxide sequestration for producing a liquid carbon dioxide stream, which may be used, for example, for enhanced oil recovery. More specifically, embodiments disclosed herein relate to a process for carbon dioxide purification integrating membrane technology, carbon dioxide distillation, and use of carbon dioxide as a self-refrigerant to result in an improved process capable of recovering a high percentage of carbon dioxide in the feed at a high purity.

2. Background

Various reservoir flooding techniques have been utilized by the oil and gas industry in enhanced oil recovery programs as a means to increase the production of hydrocarbons. In carbon dioxide flooding, carbon dioxide is pumped into the reservoir through an injection well for extended periods of time (e.g., years). The injected carbon dioxide "floods" the treated zone and forces/carries the oil in the formation toward one or more production wells where the fluids are recovered. The composition of the produced fluids changes with time and, at some point, carbon dioxide "breakthrough" will occur. After breakthrough the volume of gas and the carbon dioxide content of the produced fluids increase substantially.

Carbon dioxide may represent 60-96 mol percent (or more) of the fluids produced. In order for carbon dioxide flooding operations to be economically viable, carbon dioxide must be efficiently recovered from the produced fluids for reuse. In many cases, recovered carbon dioxide can be re-injected into the formation through the injection well, provided chemical specifications for purity are met. Product specifications for carbon dioxide can be quite high, particularly with respect to the content of hydrocarbons (i.e., methane and ethane) and/or nitrogen.

Carbon dioxide used in flooding operations may come from a variety of sources, including off-gases from chemical processes, among other sources. Processes to purify such carbon dioxide-rich streams typically involve removal of light gases such as hydrogen, nitrogen, oxygen, methane, and carbon monoxide. Many of these streams have low carbon dioxide content, including lime kiln gas, boiler flue gas and certain natural gases.

To recover carbon dioxide from streams having a low carbon dioxide content, such as a boiler flue gas stream, one solution is to scrub the gas mixture which is lean in carbon dioxide with a suitable solvent, such as monoethanolamine, sulfolane or potassium carbonate, to dissolve the carbon dioxide and then to strip the carbon dioxide from the solution so obtained; i.e., another fluid is introduced into the system in order to achieve the necessary separation. The carbon dioxide can then be compressed, dried, cooled and further purified by partial condensation or distillation. However this process is expensive in energy and a less energy-intensive alternative would be desirable.

Various other processes to recover and/or purify carbon dioxide are disclosed in U.S. Pat. Nos. 4,602,477, 4,639,257, 4,762,543, 4,936,887, 6,070,431, and 7,124,605, among others.

Large scale carbon dioxide processes are also discussed in: Hegerland et al., "Liquefaction and handling of large amount of $CO_2$ for EOR," Project Invest as, Norway, YARA International ASA (volume, date, etc.); Berger et al, "Creating a large scale CO2 infrastructure for enhanced oil recovery," presented at the $7^{th}$ International Conference of Greenhouse Gas Control Technologies, Vancouver, 2004; and in Song et al, SPE Formation Evaluation, Society of Petroleum Engineers, December 1987.

There remains a need for processes having improved carbon dioxide recovery while maintaining a high purity for the recovered carbon dioxide.

SUMMARY OF THE DISCLOSURE

In one aspect, embodiments disclosed herein relate to a process for the recovery of carbon dioxide from a gas mixture that includes pretreating a gas mixture comprising carbon dioxide, water vapor, and one or more light gases in a pretreating system to form a cooled gas mixture, fractionating the cooled gas mixture to recover a bottoms fraction comprising carbon dioxide and an overheads fraction comprising carbon dioxide and the light gases, passing the overheads fraction over a membrane selective to carbon dioxide to separate a carbon dioxide permeate from a residue gas comprising the light gases, recycling the carbon dioxide permeate to the pretreating system, and recovering at least a portion of the bottoms fraction as a purified carbon dioxide product stream Other aspects and advantages will be apparent from the following description and the appended claims.

DETAILED DESCRIPTION

In one aspect, embodiments herein relate to a process for carbon dioxide sequestration for producing a liquid carbon dioxide stream, which may be used, for example, for enhanced oil recovery. More specifically, embodiments disclosed herein relate to a process for carbon dioxide purification integrating membrane technology, carbon dioxide distillation, and use of carbon dioxide as a self-refrigerant to result in an improved process capable of recovering a high percentage of carbon dioxide in the feed at a high purity.

Processes disclosed herein may be useful for recovery and purification of carbon dioxide from various sources, including boiler flue gas, lime kiln gas, natural gases, and other off-gases from various processes. In some embodiments, the stream from which carbon dioxide is to be recovered may contain at least 30%, by volume, carbon dioxide; at least 40%, by volume, in other embodiments; at least 50%, by volume, in other embodiments; at least 60%, by volume in other embodiments; and at least 70%, by volume, in yet other embodiments. Such streams may also include other light gases, including methane, oxygen, nitrogen, argon, and water vapor, for example. Even at low feed percentages, processes disclosed herein may recover a high percentage of the carbon dioxide contained in the feed gas at a high carbon dioxide purity.

Figure 1:
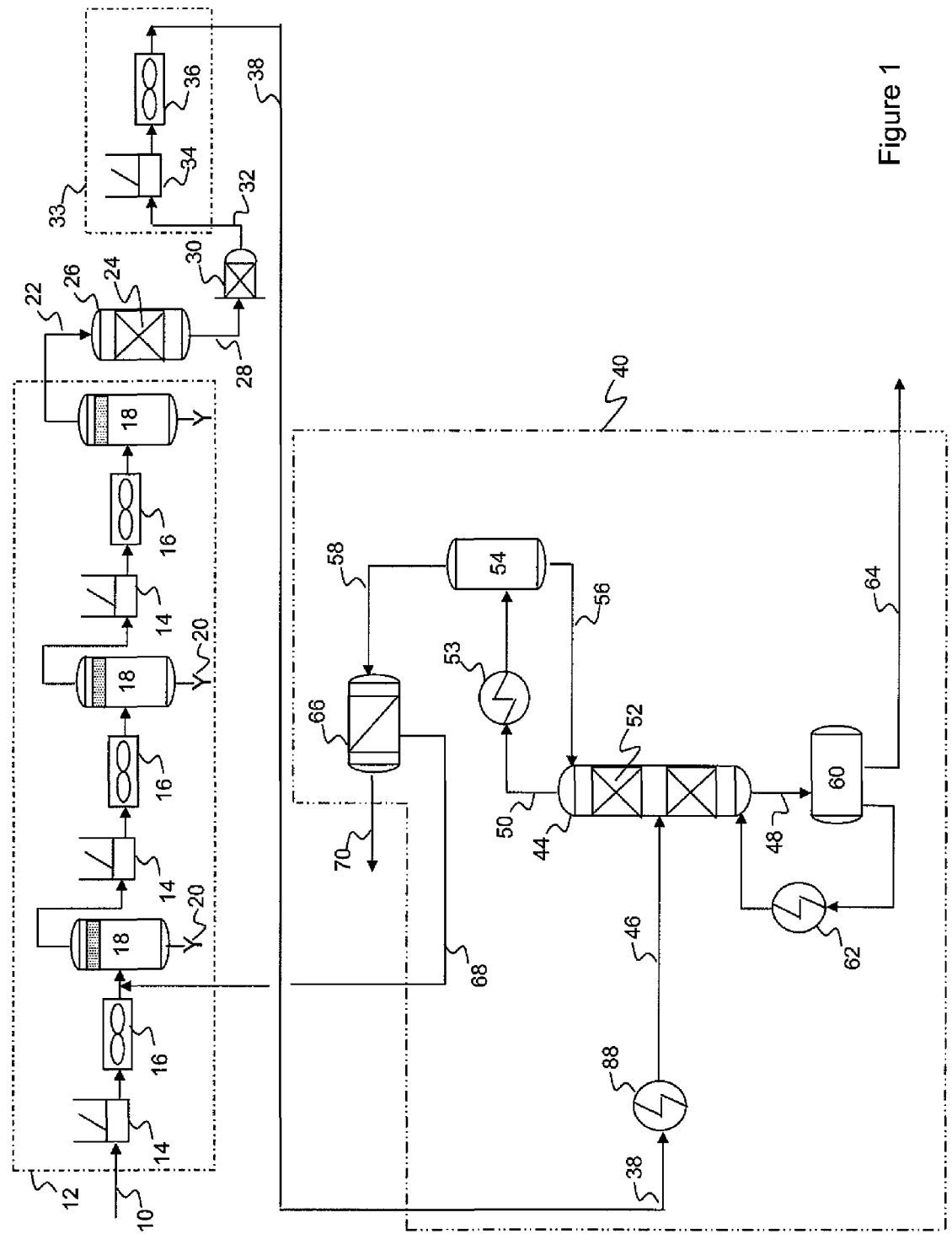
FIG. 1 is a simplified flow diagram of a carbon dioxide purification process according to embodiments disclosed herein.

Referring now to FIG. 1, a simplified flow diagram of a carbon dioxide purification process according to embodiments disclosed herein is illustrated. A stream containing carbon dioxide, other light gases, and water vapor may be pretreated to compress and dry the gas mixture in a pretreating system. As shown in FIG. 1, the pretreating system is comprised of gas compression system 12, dryer 26 and compression system 33. In other embodiments, other well known pretreatment systems can be used. For example, the gas mixture may be fed via flow line 10 to gas compression system 12. Gas compression system 12 may include one or more compressors 14, coolers 16, and scrubbers 18. As illustrated, three compression stages are included in gas compression system 12. The actual number of stages used may depend on the desired pressure increase, power distribution, discharge temperatures, and polytropic compressor efficiencies, among other variables.

After each stage of compression, the gas exiting compressors 14 may be cooled by coolers 16. For example, the gas may be cooled to a temperature in the range from about 15° C. to about 40° C., such as about 30° C., where the resulting temperature may depend upon the type of cooler, temperature of a heat exchange medium, or ambient temperature, among other factors. In some embodiments, coolers 16 may include air coolers.

Following each stage of compression and cooling, condensed water may be removed from the gas in scrubbers 18. Scrubbers 18 may be equipped, for example, with mist eliminators or other devices to separate entrained water droplets from the gas stream. The water may be recovered from scrubbers 18 via outlets 20, and in some embodiments may be drained to a wastewater treatment system (not shown).

Following compression system 12, the resulting compressed gas stream may be recovered via flow line 22. Additional water may be removed from the compressed gas in flow line 22 by passing the gas over a solid desiccant 24 contained in a dryer 26. Desiccant 24 may include, for example, type 3A molecular sieves, among other desiccants known in the art.

A dried compressed gas stream may be recovered from dryer 26 via flow line 28. In some embodiments, the compressed gas recovered from dryer 26 may have less than 200 ppm water, by volume; less than 100 ppm, by volume, in other embodiments, and less than 50 ppm, by volume, in yet other embodiments. Removal of water may attenuate the occurrences of corrosion in downstream processing equipment and water freezing during the processing and transportation of the product carbon dioxide. A dust filter 30 may be provided at the outlet of dryer 26 to remove any fines that the gas stream may pick up from desiccant 24.

Dried gas stream 32 may then be compressed via compression system 33, including one or more compressors 34 and one or more coolers 36, to result in a compressed gas stream 38 having the desired inlet gas pressure for purification system 40. In some embodiments, compressed gas stream 38 may have a pressure of at least 40 bar; compressed gas stream 38 may have a pressure in the range from about 40 to about 60 bar in other embodiments; from about 43 to about 55 bar in other embodiments; and from about 46 to about 52 bar, such as about 49 bar, in yet other embodiments.

Following pretreatment, compressed gas stream 38 may then be chilled via one or more heat exchangers 88 and fed to column 44 via flow line 46. The gas feed to column 44 may be cooled to a temperature in the range from about −30° C. to about −35° C., such as about −33° C., for example.

Column 44 may include a series of trays or packed beds above and/or below the feed inlet location to facilitate fractionation of the carbon dioxide, recovered as a bottoms fraction via flow line 48, from the overhead gas fraction, recovered via flow line 50. In order to reflux the trays or packed beds in upper section 52 of column 44, a portion of the overhead fraction recovered via flow line 50 may be condensed, via removal of heat in one or more heat exchangers 53, accumulated in drum 54, and recycled via flow line 56 as reflux. To effect the condensation of vapors, the overheads fraction may be cooled to a temperature in the range from about −50° C. to about −65° C. in some embodiments; and from about −55 to about −60° C., such as about −57° C., in other embodiments.

The carbon dioxide bottoms stream 48 may be fed to a surge tank 60. A portion of the recovered bottoms fraction may be heated via reboiler 62 and fed to column 44 to control the vapor traffic within the column. The remaining portion of the recovered bottoms fraction may be recovered as a carbon dioxide product stream via flow line 64. In some embodiments, the carbon dioxide product stream recovered may have be at least 90% carbon dioxide, by volume; at least 95% by volume in other embodiments; at least 97% by volume in other embodiments; at least 98% by volume in other embodiments; and at least 99% by volume in yet other embodiments.

The vapor fraction recovered from drum 54 via flow line 58 may include a majority of the light gases contained in the initial feed stream 10 as well as carbon dioxide. Additional carbon dioxide may be recovered by passing the vapor fraction in flow line 58 through a membrane unit 66. A compressor may be added in front of the membrane unit 66 to allow the column 44 to operate at a lower pressure and the membrane to operate at a higher pressure. Membrane unit 66 separates additional carbon dioxide from the other light gases by diffusion when the vapor fraction is passed across a membrane selective for carbon dioxide, where the diffusion rate may be a function of the area of the membranes used and the differential concentration of carbon dioxide across the one or more membranes. The carbon dioxide permeate, having passed through the membrane, may be recovered via flow line 68 and recycled to compression system 12. As illustrated, the carbon dioxide permeate is recycled to the second compression stage, however, the carbon dioxide permeate can recycled to any point of gas compression system 12. The residue, having decreased carbon dioxide content, may be recovered via flow line 70.

In some embodiments, at least 50%, by volume, of the carbon dioxide fed to membrane unit 66 may be recovered via flow line 68; at least 60%, by volume, in other embodiments; and at least 70%, by volume, in yet other embodiments.

The carbon dioxide purification according to embodiments described herein may allow for a high purity carbon dioxide stream 64 to be recovered, as described above. The additional carbon dioxide recovered via membrane unit 66 may allow the overall carbon dioxide purification process to recover greater than 65 mole %, of the carbon dioxide present in feed stream 10; a recovery of greater than 75 mole % may be achieved in other embodiments; a recovery of greater than 90 mole % may be achieved in other embodiments; greater than 95 mole % in yet other embodiments. In select embodiments, greater than 90 mole % of the carbon dioxide may be recovered at a purity of at least 95%, by volume.

Figure 2:
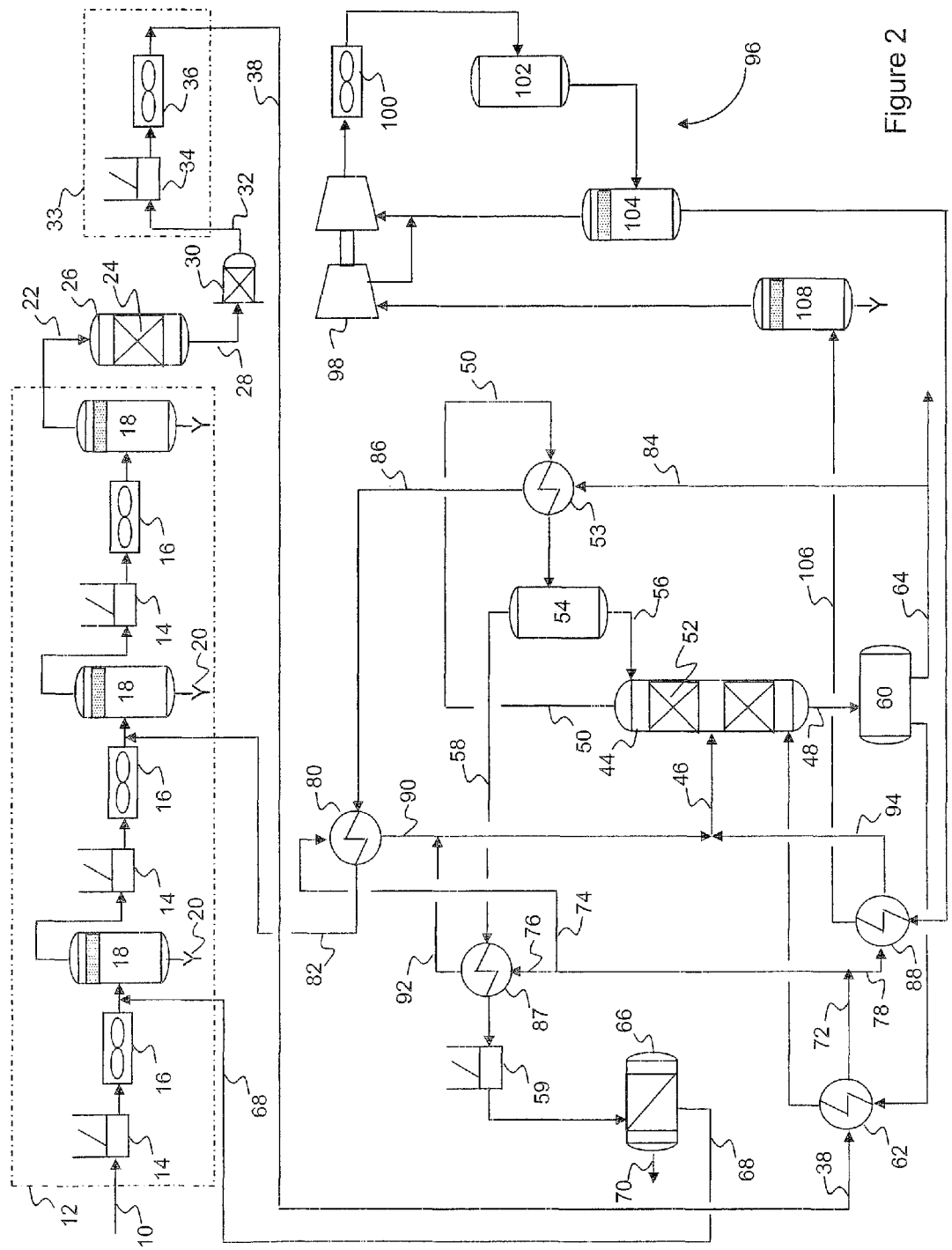
FIG. 2 is a simplified flow diagram of a carbon dioxide purification process according to embodiments disclosed herein.

In addition to the improved separations that may be attained by processes according to embodiments disclosed herein, it has also been found that additional efficiencies may be realized by using the various carbon dioxide streams as a self-refrigerant, an example of which is illustrated in FIG. 2, where like numerals represent like parts.

The compressed gas stream 38 may be used as a hot side fluid in reboiler 62 in some embodiments, producing reboil vapor and cooling the compressed gas following compression system 33. The resulting cooled compressed gas stream 72 may then be split into two or more fractions and cooled, using one or more of a portion of the carbon dioxide product stream 64, vapor fraction 58 recovered from drum 54, and a refrigerant, prior to feeding the compressed gas to column 44 via flow line 46.

As illustrated in FIG. 2, compressed gas stream 72 may be split into three fractions, including flow streams 74, 76, and 78. Fraction 74 may be cooled via indirect heat exchange with a portion of the carbon dioxide product 64 in heat exchanger 80 via flow lines 84 and 86. The slip stream of carbon dioxide product may then be fed via flow line 82 to compression system 12, such as to the third stage compressor.

In some embodiments, as illustrated, a portion of the carbon dioxide product stream 64 may be fed via flow line 84 and used to condense a portion of the overheads fraction from flow line 50 in heat exchanger 53. The slip stream of carbon dioxide vaporized or boiled from the cold side of heat exchanger 53 may then be fed via flow line 86 to cool fraction 74 in heat exchanger 80.

Fraction 76 may be cooled via indirect heat exchange with vapor fraction 58 recovered from drum 54 in heat exchanger 87. Optionally, a compressor 59 may be added in front of the membrane unit 66 to allow the column 44 to operate at a lower pressure and the membrane unit 66 to operate at a higher pressure.

Fraction 78 may be cooled via indirect heat exchange with a refrigerant in heat exchanger 88. The three fractions 74, 76, 78 may then be recombined via flow lines 90, 92, 94 and fed via flow line 46 to column 44. The amount of feed gas fed through each of lines 74, 76, 78 may depend upon the heat exchange requirements, including the temperature of compressed gas streams 38, 72, the desired feed temperature, and the temperatures of streams 58, 64, 86, and the refrigerant, among other variables.

In some embodiments, the refrigerant used for indirect heat exchange in heat exchanger 88 is propane; other refrigerants or mixtures of refrigerants may also be used. The propane may be circulated in refrigeration loop 96, which may include compressors 98, which may include two-stage compression systems, cooler 100, accumulator 102, and economizer 104. The vapor from economizer 104 may be recycled to the suction of the second stage compressor, and the liquid may be fed to heat exchanger 88, cooling the compressed feed 78 to a temperature below about −33° C., such as to a temperature within the range from about −25° C. to about −40° C. Flashed propane from heat exchanger 88 may be fed via flow line 106 to scrubber 108 and then to compressor 98.

Figure 3:
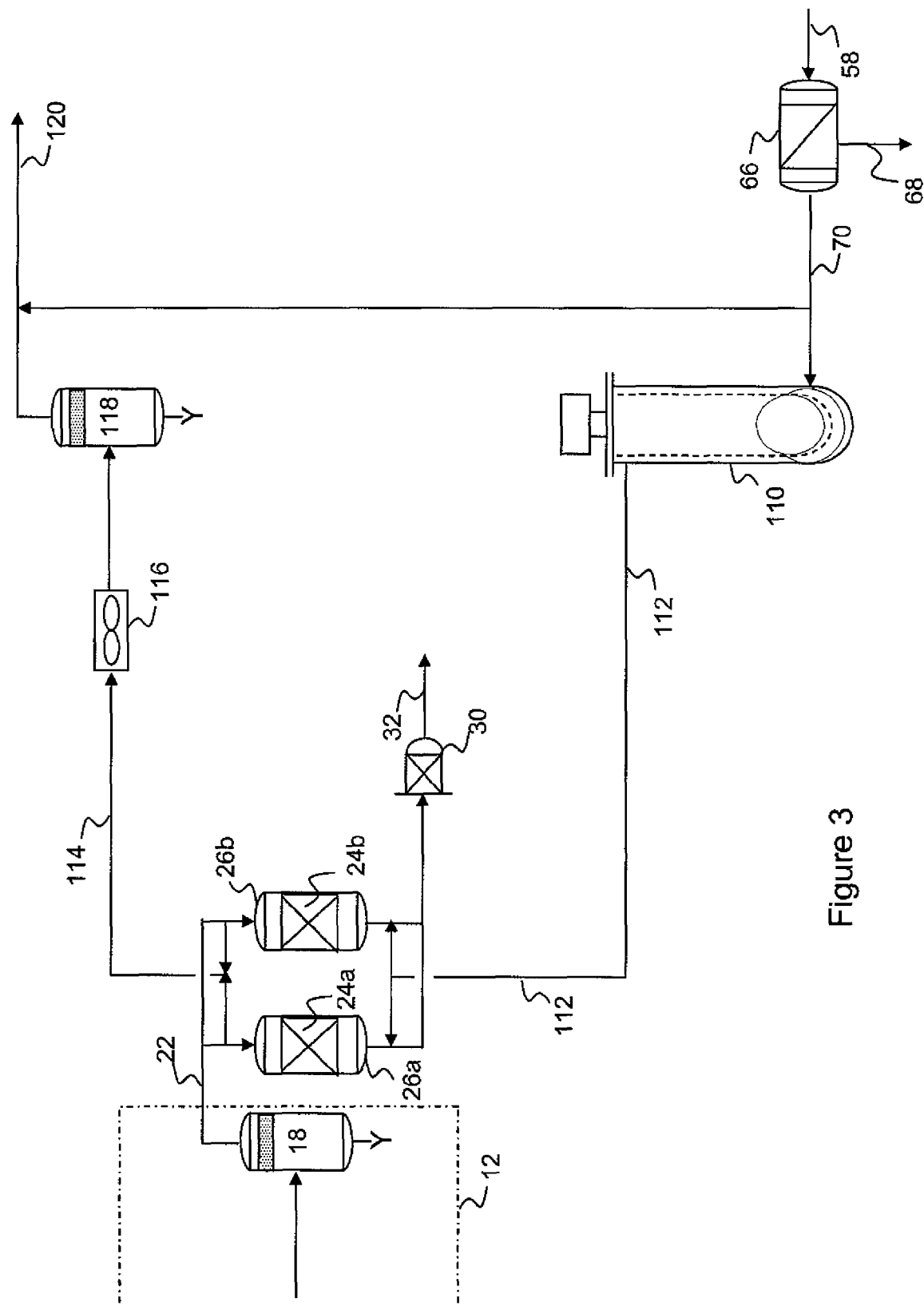
FIG. 3 is a simplified flow diagram of a portion of a carbon dioxide purification process according to embodiments disclosed herein.

Additional efficiencies may also be realized by recovery and reuse of residue stream 70 recovered from membrane 66, an example of which is illustrated in FIG. 3, where like numerals represent like parts. A portion of residue stream 70 may be heated to an elevated temperature, such as a temperature greater than 200° C. in some embodiments, in heater 110, such as an electric heater. The heated residue gas may then be fed via flow line 112 to the dryer 26 (26a or 26b) being regenerated to remove water adsorbed by the desiccant. In this embodiment, the carbon dioxide purification system includes at least two dryers 26a, 26b, where one bed of desiccant, such as bed 24a, may be in use while the other bed of desiccant, such as bed 24b, is being regenerated (valve positioning not illustrated). The regeneration gas may then be recovered via flow line 114, and optionally cooled to recover water using cooler 116 and scrubber 118. The gas used to regenerate the beds and any unused portion of residue gas 70 may then be combined in flow stream 120 for further recovery, treatment, or disposal.

As described above, embodiments of the carbon dioxide purification system advantageously provide for the recovery of 90% or more of the carbon dioxide in the feed at a purity of 95% or more. Advantageously, processes disclosed herein may be used to recover high purity carbon dioxide streams from low carbon dioxide content streams, including boiler flue gas and lime kiln gas, among others, without the use of solvents, such as amines. The purified carbon dioxide decreases the amount of carbon dioxide contributing to the greenhouse gas inventory of a production facility, and may be used for enhanced oil recovery, or may be her purified for use in carbonated drinks. Embodiments disclosed herein also provide for the advantageous use of waste gas streams and product streams for heat recovery, and desiccant regeneration.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for the recovery of carbon dioxide from a gas mixture, the process comprising:
   pretreating a feed gas mixture comprising carbon dioxide, water vapor, and one or more light gases selected from the group consisting of methane, oxygen, nitrogen and argon in a pretreating system to form a cooled gas mixture, wherein pretreating includes compressing in a first compressor and cooling in a first heat exchanger using a first cooling fluid;
   fractionating the cooled gas mixture in a first fractionator to recover a bottoms fraction comprising carbon dioxide and an overheads fraction comprising carbon dioxide and at least a portion of the light gases;
   cooling the overheads fraction in a second heat exchanger using a second cooling fluid to form a liquid recycle stream and a vapor stream,
   passing at least a portion of the vapor stream over a membrane selective to carbon dioxide to separate a carbon dioxide permeate from a residue gas comprising light gases;
   recycling the carbon dioxide permeate to the pretreating system; and
   removing at least a portion of the bottoms fraction from the first fractionator as a purified carbon dioxide product stream containing at least 95% carbon dioxide by volume,
   wherein at least 90 mol % of the carbon dioxide from the feed gas mixture is recovered in the purified carbon dioxide product stream.

2. The process of claim 1, wherein the pretreating further comprises drying the compressed gas mixture.

3. The process of claim 2, wherein the drying comprises at least one of contacting the gaseous mixture with a desiccant and separating condensed water from the compressed gas mixture.

4. The process of claim 1, wherein the cooled gas mixture comprises less than 50 ppm water, by volume.

5. The process of claim 1, wherein the fractionating is performed at a pressure in the range from about 40 to about 60 bar.

6. The process of claim 1, wherein the cooling in the first heat exchanger includes indirect heat exchange of the feed gas mixture with at least one of a portion of the bottoms fraction and a portion of the overheads fraction.

7. The process of claim 6, wherein the feed gas is cooled to a temperature in the range from about −30° C. to about −35° C. in the first heat exchanger.

8. The process of claim 1, wherein the purified carbon dioxide product stream contains at least 98% carbon dioxide by volume.

9. The process of claim 3, wherein at least 95 mol % of the carbon dioxide in the cooled gas mixture is recovered in the purified carbon dioxide product stream.

10. The process of claim 1, wherein the purified carbon dioxide product stream contains at least 99% carbon dioxide by volume.

11. The process of claim 1, wherein at least one of the first cooling fluid and the second cooling fluid is a carbon dioxide-containing stream obtained from the process.

12. The process of claim 1, wherein both of the first cooling fluid and the second cooling fluid are carbon dioxide-containing streams obtained from the process.

* * * * *